(12) United States Patent
Tsukamoto (10) Patent No.: US 8,227,103 B2
(45) Date of Patent: Jul. 24, 2012

(54) BATTERY PACK HAVING BATTERIES IN A POROUS MEDIUM

(75) Inventor: Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 748 days.

(21) Appl. No.: 12/380,345

(22) Filed: Feb. 25, 2009

(65) Prior Publication Data

US 2009/0280400 A1 Nov. 12, 2009

Related U.S. Application Data

(60) Provisional application No. 61/067,504, filed on Feb. 27, 2008.

(51) Int. Cl.
*H01M 2/10* (2006.01)

(52) U.S. Cl. .......... 429/100; 429/99; 429/149; 429/152; 429/153; 429/163

(58) Field of Classification Search .................. None
See application file for complete search history.

(56) References Cited

U.S. PATENT DOCUMENTS

| | | |
|---|---|---|
| 2,901,528 A | 8/1959 | Alton et al. |
| 3,487,299 A | 12/1969 | Rosacker et al. |
| 3,769,095 A | 10/1973 | Schmidt |
| 4,255,782 A | 3/1981 | Joyce |
| 4,916,034 A | 4/1990 | Hulsebus et al. |
| 4,957,829 A | 9/1990 | Holl |
| 5,017,441 A | 5/1991 | Lindner |
| 5,140,744 A | 8/1992 | Miller |
| 5,218,284 A | 6/1993 | Burns et al. |
| 5,298,341 A | 3/1994 | Khandkar et al. |
| 5,302,110 A | 4/1994 | Desai et al. |
| 5,378,555 A | 1/1995 | Waters et al. |
| 5,422,558 A | 6/1995 | Stewart |
| 5,437,939 A | 8/1995 | Beckley |
| 5,504,415 A | 4/1996 | Podrazhansky et al. |
| 5,516,603 A | 5/1996 | Holcombe |
| 5,534,765 A | 7/1996 | Kreisinger et al. |
| 5,539,297 A | 7/1996 | Fiebig |
| 5,567,544 A | 10/1996 | Lyman |
| 5,596,567 A | 1/1997 | deMuro et al. |
| 5,639,571 A | 6/1997 | Waters et al. |
| 5,641,587 A | 6/1997 | Mitchell et al. |
| 5,652,499 A | 7/1997 | Morita et al. |
| 5,709,280 A | 1/1998 | Beckley et al. |
| 5,736,272 A | 4/1998 | Veenstra et al. |
| 5,851,695 A | 12/1998 | Misra et al. |
| 5,969,503 A | 10/1999 | Davis et al. |
| 6,002,240 A | 12/1999 | McMahan et al. |
| 6,094,034 A | 7/2000 | Matsuura |
| 6,140,927 A | 10/2000 | Whitmire |
| 6,373,222 B2 | 4/2002 | Odaohhara |
| 6,377,432 B1 | 4/2002 | Hashimoto |

(Continued)

FOREIGN PATENT DOCUMENTS

EP 1460698 A1 9/2004

*Primary Examiner* — Cynthia Lee (74) *Attorney, Agent, or Firm* — Gavrilovich, Dodd & Lindsey, LLP (57) ABSTRACT

A battery pack includes a porous medium positioned in a case. The porous medium hold several batteries. The battery pack also includes terminals for accessing power from the batteries held by the porous medium. The terminals are accessible from outside of the case. The battery pack also includes a flame retardant absorbed into pores of the porous medium.

32 Claims, 7 Drawing Sheets

U.S. PATENT DOCUMENTS

| | | |
|---|---|---|
| 6,420,851 B1 | 7/2002 | Schoofs et al. |
| 6,462,551 B1 | 10/2002 | Coates et al. |
| 6,465,986 B1 | 10/2002 | Haba |
| 6,479,185 B1 | 11/2002 | Hilderbrand |
| 6,524,739 B1 | 2/2003 | Iwaizono et al. |
| 6,565,986 B2 | 5/2003 | Itoh |
| 6,586,132 B1 | 7/2003 | Fukuda et al. |
| 6,600,641 B2 | 7/2003 | Oglesbee et al. |
| 6,639,408 B2 | 10/2003 | Yudahira et al. |
| 6,781,343 B1 | 8/2004 | Demachi et al. |
| 6,882,061 B1 | 4/2005 | Ashtiani et al. |
| 6,980,859 B2 | 12/2005 | Powers et al. |
| 7,553,583 B2 | 6/2009 | Eaves |
| 7,573,233 B1 | 8/2009 | Chow et al. |
| 7,573,234 B1 | 8/2009 | Tsukamoto |
| 2002/0070710 A1 | 6/2002 | Yagi et al. |
| 2002/0183801 A1 | 12/2002 | Howard et al. |
| 2003/0013009 A1 | 1/2003 | Dansui et al. |
| 2003/0042870 A1 | 3/2003 | Yau et al. |
| 2003/0129457 A1 | 7/2003 | Kawai et al. |
| 2003/0152830 A1 | 8/2003 | Eaves |
| 2003/0186116 A1 | 10/2003 | Tanjou |
| 2004/0018419 A1 | 1/2004 | Sugimoto et al. |
| 2004/0058233 A1 | 3/2004 | Hamada et al. |
| 2004/0095098 A1 | 5/2004 | Turner et al. |
| 2004/0096713 A1 | 5/2004 | Ballantine et al. |
| 2004/0138785 A1 | 7/2004 | Emori et al. |
| 2004/0201365 A1 | 10/2004 | Dasgupta et al. |
| 2004/0253512 A1 | 12/2004 | Watanabe et al. |
| 2005/0007068 A1 | 1/2005 | Johnson et al. |
| 2005/0042505 A1 | 2/2005 | Cooper et al. |
| 2005/0140335 A1 | 6/2005 | Lee et al. |
| 2005/0269995 A1 | 12/2005 | Donnelly et al. |
| 2006/0076923 A1 | 4/2006 | Eaves |
| 2006/0208692 A1 | 9/2006 | Kejha |
| 2006/0214640 A1 | 9/2006 | Woo et al. |
| 2007/0029124 A1 | 2/2007 | DasGupta et al. |
| 2007/0126400 A1 | 6/2007 | Benckenstein et al. |
| 2008/0063934 A1 | 3/2008 | Bechtold et al. |
| 2009/0280400 A1 | 11/2009 | Tsukamoto |

BATTERY PACK HAVING BATTERIES IN A POROUS MEDIUM

REFERENCE TO RELATED APPLICATIONS

This application claims priority to U.S. Provisional Patent application Ser. No. 61/067,504, filed on Feb. 27, 2008, entitled "Battery Pack Having Batteries in a Porous Medium," and incorporated herein in its entirety.

FIELD

The present invention relates to power sources and more particularly to packaging of power sources.

BACKGROUND

Automobiles are becoming increasingly reliant on battery systems both to power movement of the automobile and to power other functions of the automobile. Additionally, there is an increasing demand for improved fuel efficiency in these automobiles. This demand is often met by decreasing the size and weight of the automobile. The desire for decreased size and weight of the automobile places additional challenges on battery design. For instance, the decreasing size of the automobile means that these batteries often must fit into unusually shaped spaces. While fitting into the unusually shaped spaces, these batteries must retain resistance to flammability and volatility. As a result, there is a need for an improved battery system.

SUMMARY

A battery pack includes a porous medium positioned in a case. The porous medium holds several batteries. The battery pack also includes terminals for accessing power from the batteries held by the porous medium. The terminals are accessible from outside of the case. The battery pack also includes an electrically, electrochemically and chemically inert liquid in the pores of the porous medium. In some instances, the liquid is also outside the pores of the porous medium. The liquid can include or consist of a flame retardant. In some instances, the porous medium has a solid-liquid phase transition at a temperature less than a runaway temperature of the batteries. In some instance, the porous medium has a thermal conductivity greater than 1 W/mk and a melting point of less than 350° C. and the flame retardant is included in a liquid having an electrical conductivity less than $10^{-5}$ $Scm^{-1}$. The porous medium can be a plastic such as a substituted or unsubstituted polyphenylene sulfide (PPS). In some instances, the porous medium has a porosity greater than 5%.

The flame retardant can include or consist of a perfluorocarbon, a phosphazene, or a fully or partially halogenated compound selected from a group consisting of alkanes, ethers, ketones, and amines substituted with one or more alkyl groups.

In some instances, the batteries are connected in parallel groups and series groups. Each parallel group includes a plurality of the batteries connected in parallel and each series group connects one of the batteries from each of the parallel groups in series.

An embodiment of the battery pack includes a porous medium positioned in a case. The porous medium includes a substituted or unsubstituted polyphenylene sulfide (PPS). The porous medium has a porosity greater than 5%, a thermal conductivity greater than 1 W/mk, and a volume based resistivity greater than $10^{14}$ $\Omega cm$, and in some instance a melting point of less than 350° C. The porous medium holds batteries connected in parallel groups and series groups. Each parallel group includes a plurality of the batteries connected in parallel and each series group connects one of the batteries from each of the parallel groups in series. The battery pack also includes terminals for accessing power from the batteries. The terminals are accessible from outside of the case. A flame retardant is absorbed into the pores of the porous medium. The flame retardant is a fully or partially halogenated compound selected from a group consisting of alkanes, ethers, ketones, and amines substituted with one or more alkyl groups.

DESCRIPTION

A battery pack includes multiple batteries positioned in a case. The batteries are connected to terminals that are accessible from outside of the case and that can be used to access electrical energy from the batteries. The batteries are positioned in a porous medium that is positioned in the case. The porous medium can include or consist of a heat absorbing material. For instance, the porous medium can include or consist of a material that experiences a phase transition between the operating temperature of the batteries and the runaway temperature of the batteries. The phase transition can absorb energy produced by the batteries as they approach the runaway temperature. Additionally or alternately, the porous medium can have a high thermal conductivity and a low electrical conductivity. The inventors have surprisingly found that plastics such as poly(phenylene sulfide)s can satisfy these conditions. The combination of the high thermal conductivity and a low electrical conductivity can enhance the ability of the porous medium to absorb energy from the batteries. The ability of the porous medium to absorb this energy can reduce the likelihood of failure of the batteries.

A medium can be in the pores of the porous medium. The medium can include or consist of a flame retardant. The flame retardant can use one of several mechanism to supress volatility of the batteries. The presence of the flame retardant in the pores further reduces the likelihood of failure of the batteries.

In some instances, the batteries are connected in parallel groups and series groups. Each parallel group includes a plurality of the batteries connected in parallel and each series group connecting one of the batteries from each of the parallel groups in series. This arrangement reduces the number of components in the battery pack that are carrying large levels of electrical current. Accordingly, this arrangement further suppresses the volatility of the battery pack.

The use of multiple batteries in the battery pack allows the battery pack to occupy a large number of shape configurations by re-arranging the batteries into cases having different shapes. For instance, the shape of the one or more porous media and the positions of the batteries relative to one another can be altered so the batteries fit into a case with a different shape. Accordingly, the case can have a round cross section, or a cross section with more than one radius of curvature in addition to any corners, or a cross section with more than two radii or curvature in addition to any corners. Additionally or alternatively, the case can have a cross section with more than four straight sides. The use of multiple batteries allows for a collection of cases that each has a different shape as described above but has the same number of batteries and accordingly provides about the same voltage and/or capacity. As a result, the battery pack is suitable for positioning in the unusually shaped locations that are available in increasingly smaller automobiles.

Figure 1:
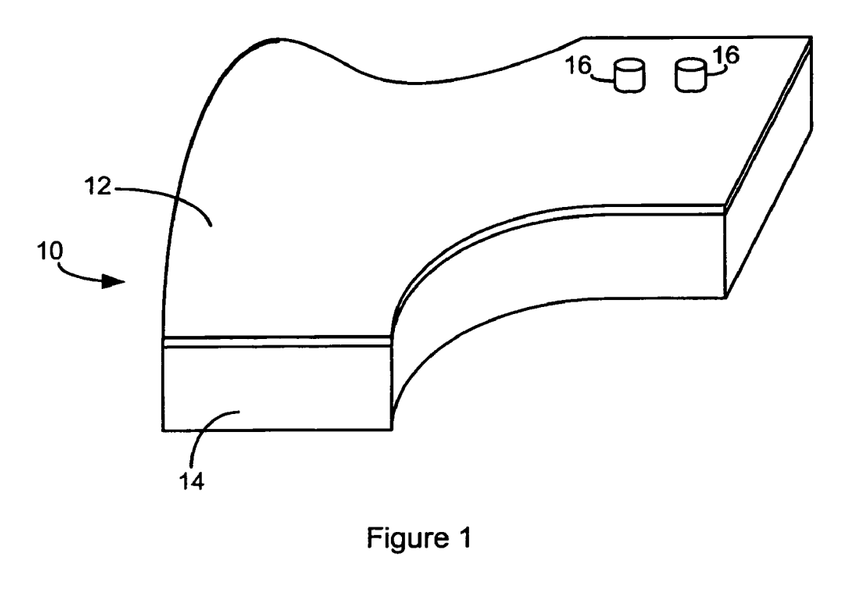
FIG. 1 is a perspective view of a battery pack. The battery pack includes a case that includes a cover on a receptacle.

FIG. 1 is a perspective view of a battery pack. The battery pack includes a case 10. The case 10 can be configured to hold a liquid without leakage of the liquid from the case 10. In some instances, the case 10 can be configured to hold a liquid without leakage of the liquid from the case 10 regardless of the orientation of the case 10. For instance, the case 10 can be waterproof. The case 10 can include a cover 12 immobilized and/or attached to a receptacle 14.

The case 10 can include terminals 16. Although the terminals 16 are shown positioned on the cover 12, one or more of the terminals 16 can be positioned on the receptacle 14. The terminals 16 can extend through the case 10 or can be positioned on the case 10. The terminals 16 can be used to access the electrical output from batteries 18 housed within the case 10. For instance, when the battery pack is used to power movement of a car, the power for powering movement of the car can be accessed through the terminals 16.

The case 10 can be designed to quickly dissipate heat generated from batteries by air cooling or liquid cooling. For instance, all of the case 10 or portions of the case 10 can be made of aluminum or thermal conductive plastics. In some instances, the case 10 has a heat sink type fin and/or can a coolant liquid is circulated through the case.

Figure 2:
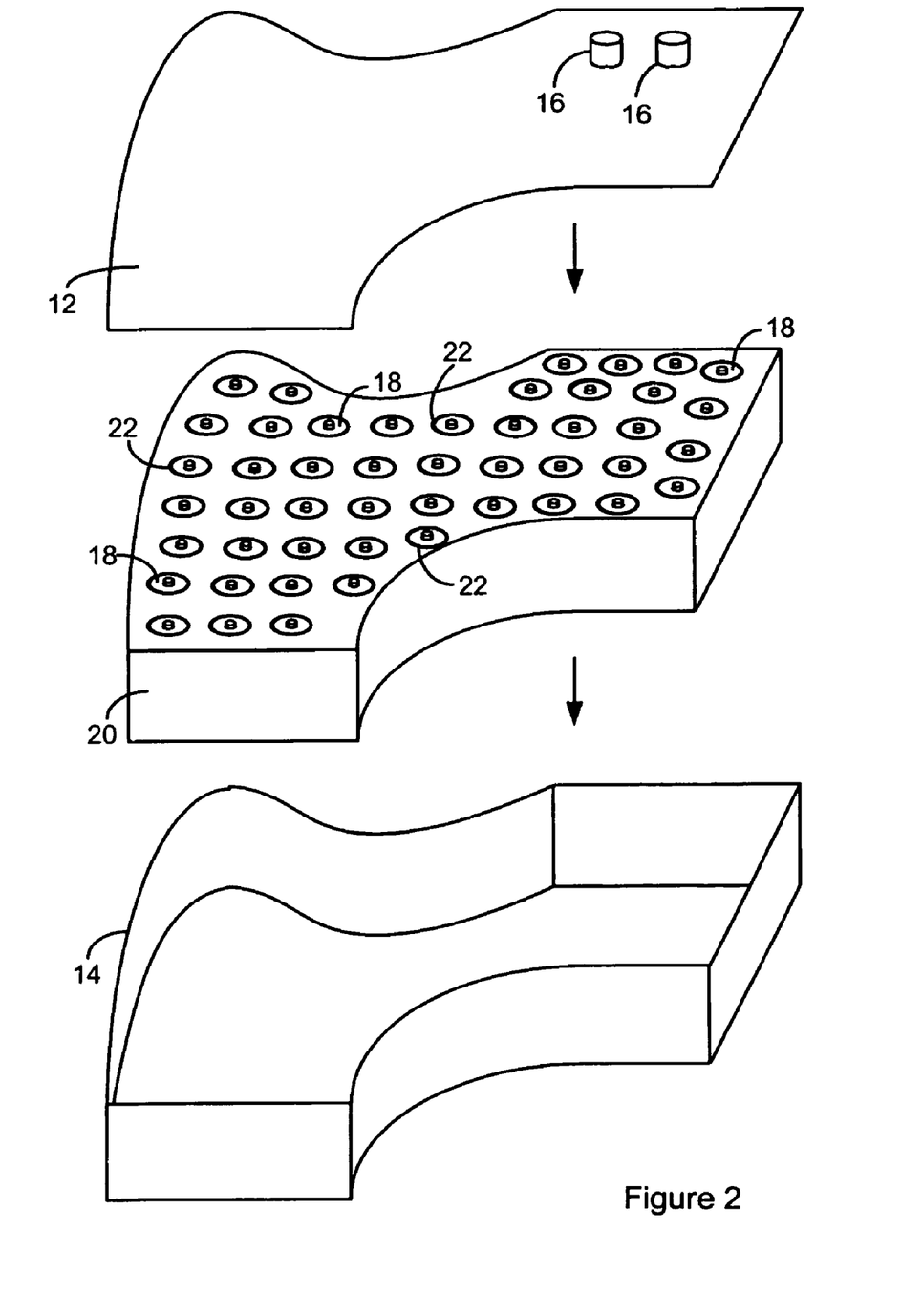
FIG. 2 illustrates the case from FIG. 1 with the cover detached from the receptacle and also illustrates batteries positioned in the case.

FIG. 2 illustrates the case 10 from FIG. 1 with the cover 12 detached from the receptacle 14 and also illustrates contents of the case 10. The case 10 contents include a battery collection. The battery collection includes batteries 18 held in a porous medium 20. For instance, each battery can be positioned in a different opening 22 through the porous medium 20. As a result, the porous medium 20 can surround each of the batteries 18 along an axis that extends through each battery. Alternately, the porous medium 20 can surround only a portion of the batteries 18 along an axis that extends through each battery.

The porous medium 20 can contact all or a portion of the batteries 18. For instance, the batteries 18 can each fit snugly into an opening 22 in the porous medium 20. Alternately, a material can be positioned between each battery and the porous medium 20 can contact both the battery and the porous medium 20. In some instances, the porous medium 20 is spaced apart from the batteries 18.

FIG. 2 shows that the porous medium 20 surrounds each of the batteries 18 along an axis that extends through each of the batteries 18. FIG. 2 also shows that the porous medium 20 is not positioned over the tops of the batteries 18. In some instances, the porous medium 20 is also not positioned under the batteries 18. In other instances, the porous medium 20 is positioned over the tops of the batteries 18 and/or under the bottoms of the batteries 18 and also surrounds the batteries 18 as illustrated in FIG. 2.

Although FIG. 2 illustrates a single porous medium 20 holding all of the batteries 18, the case 10 can include more than one porous media 20. Different porous media 20 can hold different batteries 18. Alternately, different porous media 20 can be used in conjunction with the same selection of batteries 18. For instance, one of the porous media 20 can be positioned under the batteries 18, while another porous media 20 surrounds the batteries 18, and another porous media 20 is positioned over the batteries 18.

The one or more porous media can include or consist of a variety of materials such as metals, ceramics, or plastics. Suitable porous media can optionally have a high electrical resistance to prevent or reduce the electrical current from being conducted through the heat absorbing material. Suitable resistance for the porous material includes, but is not limited to, resistance greater than $10^{10}$ Ωcm, $10^{14}$ Ωcm, or $10^{16}$ Ωcm. Additionally, the porous media preferably has a high thermal conductivity to permit the heat-absorbing material to conduct heat away from the batteries 18. Suitable thermal conductivity for the porous material includes, but is not limited to, thermal conductivity greater than 1 W/mK, 5 W/mK or 10 W/mK.

In some instances, the porous material includes or consists of a heat-absorbing material or can be a heat-absorbing material. Suitable heat-absorbing material have a phase transition above the operational temperature of the battery. The operational temperature of battery packs employed in automobiles is generally higher than 40° C., 60° C., or 80° C. Additionally, heat-absorbing materials have a phase transition below the runaway temperature of the battery. The runaway temperature for a battery is the onset temperature for exothermic behavior resulting in catastrophic failure of the battery. The runaway temperature can be determined from the adiabatic self-heating rate of the battery (dT/dt) as determined from accelerated rate calorimetry. The runaway temperature can be identified as the temperature where a sharp increase in the self-heating rate is associated with catastrophic failure of the battery. Since secondary batteries 18 are generally charged to less than theoretical capacity to promote longer cycle life and higher safety during normal use, the runaway temperature of the battery can be the runaway temperature of the battery when the battery is charged to 60% of the theoretical capacity of the limiting electrode. Accordingly, the self-heating rate data can be generated for a battery charged to 60% of the theoretical capacity of the limiting electrode. The batteries 18 in the battery pack can be lithium ion batteries 18 which generally have a runaway temperature of about 230° C., 260° C., or 330° C. As a result, in some instances, suitable heat-absorbing material can have a phase transition that occurs in a range of 80° C., 160° C., or 280° C. to 130° C., 200° C., or 350° C.

A phase transition generally requires more energy than merely increasing the temperature of a material. As a result, the heat-absorbing material having a phase transition between the operational temperature of the batteries 18 and the runaway temperature of the battery improves the ability of the battery pack to absorb thermal energy from the batteries 18 in a temperature range where failure of the battery can be prevented by removal of thermal energy from the batteries 18. The phase transition is preferably a liquid-gas phase transition but can be a solid-liquid phase transition, or sublimation.

Suitable heat absorbing materials include, but are not limited to, plastics such as thermoplastics. A suitable thermoplastic is substituted or unsubstituted poly(phenylene sulfide)

s. An example of a suitable poly(phenylene sulfide) is the poly(phenylene sulfide) sold under the tradename CoolPoly® D5108 by Cool Polymers, Inc. with a place of business in Warwick, R.I., USA. This poly(phenyl sulfide) has a thermal conductivity of 10 W/mk, a volume based resistivity greater than $10^{16}$ Ωcm, and a melting point of about 285 C.

A liquid can be positioned in the case 10. The liquid can include or consist of one or more flame retardants for suppressing flame oriented volatility in the battery pack. The liquid can be absorbed into the one or more porous media 20. In some instances, the one or more porous media 20 are saturated with the liquid. In some instances, the one or more porous media 20 are saturated with the liquid and the liquid is also positioned between one or more of the porous media 20 and the case 10 and/or between different porous media 20. Accordingly, the liquid can also be positioned outside of the pores and in contact with batteries and/or the case. In a thermal event where battery becomes unusually hot, the liquid as well as porous material remove heat from battery and can quench the cell to improve battery pack safety by preventing thermal run away. To remove heat faster, in some instance the liquid evaporates around battery and condenses at the inner case surface, thus accelerate heat removal by mass transfer not only by convection or conduction.

Since the liquid can be between one or more of the porous media 20 and the case 10 and/or between different porous media 20, the liquid can conduct electrical energy between different locations in the battery pack. As a result, the liquid can cause different batteries in the battery pack to self-discharge at different rates. This self-discharge can adversely affect the cycling performance of the battery pack. The self-discharge can be reduced by reducing the electrical conductivity of the liquid. For instance, the electrical conductivity of the liquid can be less than $10^{-5}$ Scm$^{-1}$ and is preferably less than $10^{-6}$ Scm$^{-1}$ and can be less than $10^{-7}$ Scm$^{-1}$. The electrical conductivity of the liquid can be more important than the electrical conductivity of the one or more porous medium. For instance, the batteries can be electrically insulated from the porous medium using a variety of techniques. However, electrically insulating the liquid from electrical components in the battery pack becomes more difficult when the liquid is outside of the pores of the one or more porous medium. As a result, in some instances, the porous medium can be electrically conducting.

Increasing the porosity of the one or more porous media 20 can increase the amount of the liquid held within the case 10. The porosity can be increased by increasing the number and/or size of the pores. A suitable porosity for the one or more porous media 20 includes porosities greater than 5%, 20%, or 60%. The pores can be a network of channels that are that are not uniform in size or shape. Alternately, pores can be holes or openings with consistent sizes and/or shapes. In some instances, the pores are manufactured through techniques such as drilling. When the heat absorbing material is a plastic such as poly(phenylene sulfide), the porous medium 20 can be made by pressing together pellets or beads of the plastic at a temperature, pressure, and time interval that joins the pellets together without entirely melting the material. The temperature, pressure, and time interval can be selected to achieve the desired porosity.

Suitable flame retardants can stop or reduce battery volatility by several different mechanisms. The flame retardant can have a high heat capacity in its liquid phase to absorb heat from the battery and slow down the reaction associated with thermal runaway. As a result, one or more of the flame retardants can have a boiling point higher than the runaway temperature of the battery to address the reactions after the runaway triggering reaction. The flame retardant can also be selected to start boiling near the runaway temperature. This change of phase from the liquid to gas state also absorbs heat and can slow down or even shut down exothermic reactions associated with thermal runaway. The evaporated flame retardant can also creates a gaseous mixture in the case 10. This gaseous mixture containing the flame retardant can have a higher heat capacity than the atmosphere alone, and can cool down the combustion zone of the battery and prevent further reactions. As a result, the boiling point of a flame retardant that employs this mechanism to suppress volatility affects the temperature at which the flame retardant becomes effective. The boiling point of a flame retardant that employs this mechanism to suppress volatility can be lower than the runaway temperature to ensure that the flame retardant become effective before the volatility occurs.

Because the battery pack is normally used in a temperature range below 80° C., in some instances, at least one of the flame retardants or all of the flame retardants has a boiling point greater than 80° C. to prevent the flame retardants from evaporating during normal use of the battery pack. In some instances, at least one of the flame retardants or all of the flame retardants has a boiling point greater than 80° C., 120° C., 200° C., and/or less than 160° C., 240° C. or 350° C.

As a result of the fire retarding mechanism employed by many of the flame retardants, a flame retardant with reduced heats of vaporization and elevated vapor pressures may provide the most effective flame retardation. In some instances, all or a portion of the flame retardants have a heat of vaporization lower than 150 J/g at boiling point and 1 atm, or 105 J/g at boiling point and 1 atm, and/or a vapor pressure greater than 0.01 kPa at 25° C., or 1 kPa at 25° C. In some instances, all or a portion of the flame retardants have heat capacities higher than 500 J/kg° C. at 25° C., higher than 800 J/kg° C. at 25° C., or higher than 1000 J/kg° C. at 25° C. A flame retardant with an elevated heat capacity can absorb additional heat from the batteries 18 when in the liquid state. In some instances, all or a portion of the flame retardants have a heat of vaporization lower than 150 J/g at boiling point and 1 atm, or 105 J/g at boiling point, and/or a vapor pressure greater than 0.01 kPa at 25° C., or 1 kPa at 25° C.

The flame retardant can include or consist of one or more first flame retardants, one or more second flame retardants, one or more third flame retardants, one or more fourth flame retardants, or combinations thereof. In some instances, the flame retardant includes at least two components selected from a group consisting of a first flame retardants, a second flame retardant, a third flame retardant, and a fourth flame retardant. The flame retard preferably includes or consists of a fourth flame retardant.

Example first flame retardants include, but are not limited to, phosphazenes including cyclic phosphazenes such as cyclotriphosphazene. The cyclic phosphazenes can be fully or partially halogenated. For instance, the cyclic phosphazenes can be fully or partially fluorinated. Additionally or alternately, the cyclic phosphazenes can have one or more substituents selected from a group consisting of linear or cyclic alkyl groups, alkoxy groups, cycloalkoxy groups, and aryloxy groups. The substituents can be unhalogenated, fully halogenated or partially halogenated. In some instances, the cyclic phosphazenes are fully substituted with halogens and substituents selected from a group consisting of linear or cyclic alkyl groups, alkoxy groups, cycloalkoxy groups, and aryloxy groups. In some instances, all or a portion of the phosphazene is selected such that evaporation of the at least one of the phosphazene increases the heat capacity of the gaseous atmosphere in the battery above the heat capacity of the gaseous atmosphere before evaporation of the flame retardant.

A suitable cyclic phosphazene for use as the first flame retardant includes a cyclotriphosphazene. An example of a cyclotriphosphazene that is fully substituted with fluorines and a single alkoxy substituent is represented by:

An example of a cyclotriphosphazene that is fully substituted with fluorines and a plurality of alkoxy substituents is represented by:

An example of a cyclotriphosphazene that is fully substituted with fluorines and an aryloxy substituent is represent by:

These phosphazenes are generally miscible in conventional electrolytes as a result of their relatively low viscosity (commonly less than 100 cP at 25° C., and more preferably less than 20 cP at 25° C.).

Examples of second flame retardants can be perfluorocarbons and/or compounds selected from a group consisting of alkanes, ethers, ketones, and amines substituted with one or more alkyl groups where the compound is more than 60% fluorinated. In some instances, at least one second flame retardant is a ketone represented by R'(C=O)R" wherein R' is a perfluoroalkyl group and R" is a perfluoroalkyl group or an alkyl group. The ketone can be perfluoroketone such as dodecafluoro-2-methylpentan-3-one. In some instances, at least one second flame retardant is an ether represented by R'OR" wherein R' is a perfluoroalkyl group and R" is a perfluoroalkyl group or an alkyl group. The ether can be a segregated hydrofluoroether such as methoxy-heptafluoropropane, methoxy-nonafluorobutane, ethoxy-nonafluorobutane, perfluorohexylmethylether, and 2-trifluoromethyl-3-ethoxydodecofluorohexane. In some instances, the second phase and the one or more second flame retardants exclude ethers and specifically fully or partially halogenated ethers. In some instances, at least one second flame retardant is an amine substituted with one or more perfluoroalkyl groups such as perfluorotripentylamine, perfluorotributylamine, perfluorotripropylamine and perfluoro-n-dibutylmethylamine.

In some instances, at least one second flame retardant is a perfluoroalkane such as perfluoropentane, perfluorohexane, perfluoroheptane, perfluoroctane, and perfluoro-1,3-dimethylcyclohexane.

Examples of third flame retardants can be perfluorocarbons and/or compounds selected from a group consisting of alkanes, ethers, ketones, and amines substituted with one or more alkyl groups where the compound is more than 60% fluorinated. In some instances, at least one third flame retardant is a ketone represented by R'(C=O)R" wherein R' is a perfluoroalkyl group and R" is a perfluoroalkyl group or an alkyl group. The ketone can be perfluoroketone such as dodecafluoro-2-methylpentan-3-one. In some instances, at least one third flame retardant is an ether represented by R'OR" wherein R' is a perfluoroalkyl group and R" is a perfluoroalkyl group or an alkyl group. The ether can be a segregated hydrofluoroether such as methoxy-heptafluoropropane, methoxy-nonafluorobutane, ethoxy-nonafluorobutane, perfluorohexylmethylether, and 2-trifluoromethyl-3-ethoxydodecofluorohexane. In some instances, the third phase and the one or more third flame retardants exclude ethers and specifically fully or partially halogenated ethers. In some instances, at least one third flame retardant is an amine substituted with one or more perfluoroalkyl groups such as perfluorotripentylamine, perfluorotributylamine, perfluorotripropylamine and perfluoro-n-dibutylmethylamine. In some instances, at least one third flame retardant is a perfluoroalkane such as perfluoropentane, perfluorohexane, perfluoroheptane, perfluoroctane, and perfluoro-1,3-dimethylcyclohexane.

The use of multiple batteries 18 in the battery pack of FIG. 1 and FIG. 2 allows the battery pack to have a variety of different shapes. For instance, the shape of the one or more porous media 20 and the positions of the batteries 18 relative to one another can be altered so the batteries 18 fit into a case 10 with a different shape. Accordingly, the case 10 can have a round cross section, or a cross section with more than one radius of curvature in addition to any corners, or a cross section with more than two radii or curvature in addition to any corners as is evident from FIG. 1 and FIG. 2. Additionally or alternatively, the case 10 can have a cross section with more than four straight sides. The use of multiple batteries 18 allows for a collection of cases 10 that each has a different shape as described above but has the same number of batteries 18 and accordingly provides about the same voltage and/or capacity. As a result, the battery pack is suitable for positioning in the unusually shaped locations that are available in increasingly smaller automobiles.

Figure 3:
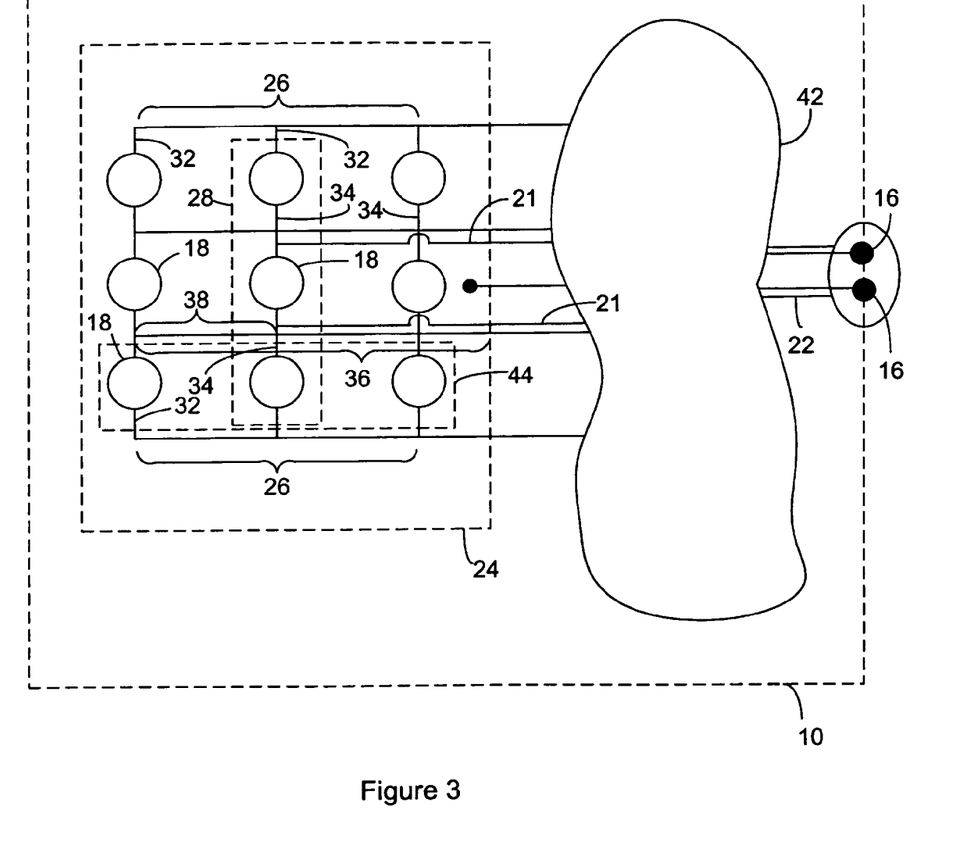
FIG. 3 illustrates suitable interconnection of the batteries in the case.

The batteries can be connected in a battery assembly. The batteries in the battery assembly can be electrically connected in parallel and/or in series. In a preferred embodiment, the batteries are connected both in parallel and in series in order to provide an arrangement that is most suitable to challenging physical conditions. For instance, FIG. 3 illustrates a suitable arrangement for the battery assembly 24. The battery assembly 24 includes two primary parallel lines 26 that connect three series groups 28 in parallel. The series groups 28 each include three batteries 18 connected in series. Primary series lines 32 each provide electrical communication between a series group 28 and a primary parallel line 26 and secondary series lines 34 provide electrical communication between the batteries 18 connected in series.

The battery assembly 24 also includes secondary parallel lines 36. The secondary parallel lines 36 each include one or more cross lines 38 that provide electrical communication between the secondary series lines 34 in different series groups 28. Accordingly, each secondary parallel line 36 provides a parallel connection between the batteries 18 in different series group 28. For instance, each secondary parallel line 36 provides electrical communication between different series groups 28 such that a battery 18 in one of the series groups 28 is connected in parallel with a battery 18 in the other series groups 28. Because a single secondary parallel line 36 only provides one of the parallel connections, another connection is needed to connect batteries 18 in parallel. The other parallel connection can be provided by another secondary parallel line 36 or by a primary parallel line 26. Each of the batteries 18 connected in parallel belongs to a parallel group 44. Accordingly, the battery assembly 24 of FIG. 3 includes three parallel groups 44.

The battery assembly 24 of FIG. 3 can be scaled to include more batteries or fewer batteries. For instance, the battery assembly 24 can include four or more batteries, twelve or more batteries, twenty-five or more batteries, eighty-one or more batteries, or one hundred or more batteries. The number of batteries in each parallel group can be the same or different from the number of batteries in each series group 28. The number of batteries in each series group 28 can be increased in order to increase the voltage of the system or decreased in order to decrease the voltage of the system. Each series group 28 can include two or more batteries; four or more batteries; more than eight batteries; or fifteen or more batteries. The number of series groups 28 can be increased for applications that require higher power levels or decreased for applications that require lower power levels. In one embodiment, the battery pack includes only one parallel group and no series groups. The battery pack can include two or more series groups; four or more series groups; ten or more series groups; or fifteen or more series groups 28.

The battery assembly can be in direct electrical communication with the terminals 16. For instance, each of the two primary parallel lines 26 can be connected directly to one of the terminals 16. Alternately, the battery assembly can be in electrical communication with electronics 42 that are in electrical communication with the terminals 16. For instance, the primary and/or secondary parallel lines can optionally be in electrical communication with the electronics as is evident in FIG. 3. Additionally, the power supply can optionally include battery specific conductors 21 connected across a battery and in electrical communication with the electronics. Although FIG. 3 illustrates battery specific conductors 21 connected across a single battery, battery specific conductors 21 can be connected across more than one battery or all of the batteries. As a result, in some instances, the electronics can monitor conditions that are unique to a particular battery. The electronics can optionally be in electrical communication with one or more sensors positioned in the case. The one or more sensors can be configured to monitor a condition in the interior of the case. For instance, a sensor can be a thermocouple configured to monitor a temperature of one or more batteries in the case.

The following applications are incorporated applications that disclose electrical connections, components, and/or functionality that can be included in the electronics: U.S. Provisional Patent Application Ser. No. 60/753,862, filed on Dec. 22, 2005, and entitled "Battery Pack System;" U.S. Provisional Patent Application Ser. No. 60/859,145, filed on Nov. 15, 2006, entitled "Power Pack;" U.S. Provisional Patent Application Ser. No. 60/601,285; filed on Aug. 13, 2004; entitled "Battery Pack;" U.S. patent application Ser. No. 11/201,987; filed on Aug. 10, 2005; and entitled "Battery Pack;" U.S. Patent Application Ser. No. 60/707,500; filed on Aug. 10, 2005; and entitled "Battery System;" U.S. Provisional Patent Application Ser. No. 60/740,150; filed on Nov. 28, 2005; and entitled "Battery System Configured to Survive Failure of One or More Batteries;" U.S. Provisional Patent Application Ser. No. 60/740,202; filed on Nov. 28, 2005; and entitled "Battery Pack System;" U.S. patent application Ser. No. 11/269,285; filed on Nov. 8, 2005; and entitled "Modular Battery Pack;" U.S. Provisional U.S. Patent Application Ser. No. 60/740,204, filed on Nov. 28, 2005, entitled "Battery Pack System;" U.S. Provisional U.S. Patent Application Ser. No. 60/753,862, filed on Dec. 22, 2005, entitled "Battery Pack System;" each of which is incorporated herein in its entirety.

The battery assembly can be connected as illustrated in FIG. 3 and/or as disclosed in one or more of the incorporated applications. Additionally, the electronics can be configured to provide the functionality described in one or more of the incorporated applications. Additionally, the electronics can include the components needed to provide this functionality. For instance, the electronics can include the components needed to execute the functionality in firmware, hardware, software or a combination thereof. As an example, the electronics can include one or more processors selected from a group consisting of analog electrical circuits, digital electrical circuits, processors, microprocessors, digital signal processors (DSPs), computers, microcomputers, ASICs, and discrete electrical components, or combinations suitable for providing the desired functionality. In some instances, the electronics include one or more memories. The one or more memories can include instructions to be executed by the one or more processors while providing the desired functionality.

Additionally, the electronics can include the components and/or electrical connections that the one or more incorporated applications describe as being associated with the provided functionality. For instance, the electronics can include the switches, resistors, capacitors, electrical lines, and other electrical connections associated with the provided functionality.

Figure 4:
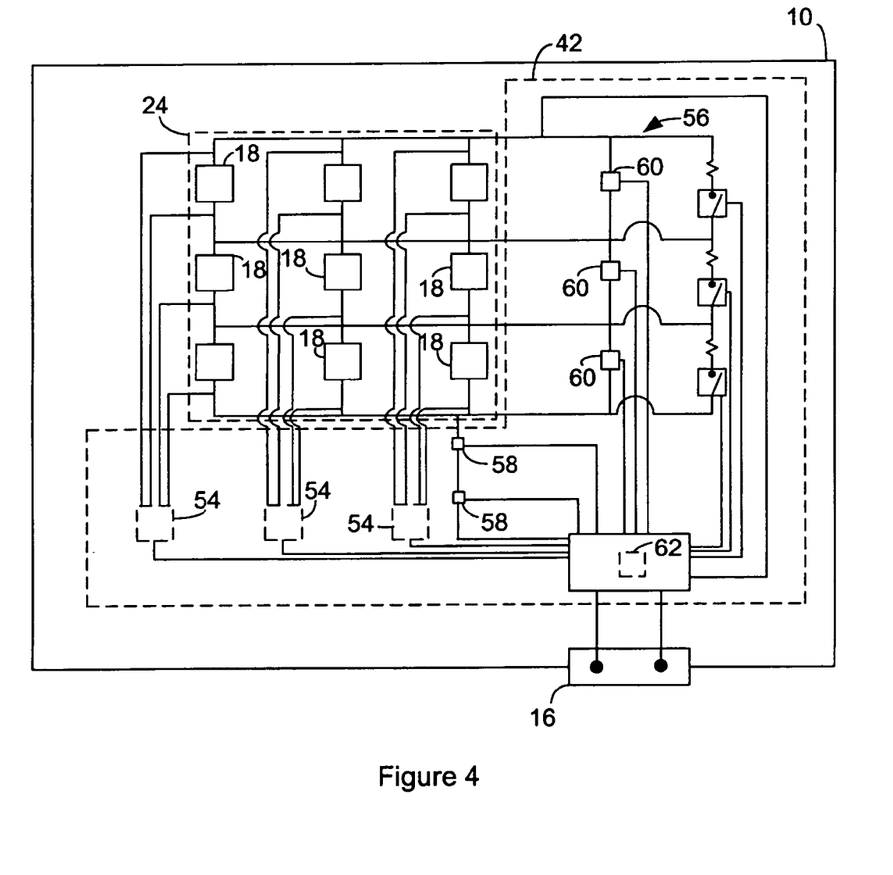
FIG. 4 illustrates the batteries interconnected as shown in FIG. 3 and in electrical communication with electronics for controlling charge and/or discharge of the batteries.

Incorporated application Ser. No. 60/859,145 (the '145 application) discloses a plurality of series circuits in electrical communication with the battery assembly and also discloses electronics configured to operate the series balancing circuits. To provide an example of the electronics being configured to provide the functionality of one of the incorporated applications, FIG. 4 illustrates a battery pack having the battery assembly used in conjunction with electronics that include the series balancing circuits 54 and shunt circuits 56 disclosed in the '145 application. As disclosed in the '145 application, the series balancing circuits 54 are configured to balance the voltage of the batteries in one of the series groups such that one or more batteries in the series group recharges one or more other batteries in the same series group. The electronics can use the shunt circuits 56 to bypass a parallel group under particular circumstances. The electronics also include other components disclosed in the '415 application such as switches 58 and voltage sensors 60.

The electronics can be configured to have the functionality that the '145 application discloses for the electronics disclosed in the '145 application. Accordingly, the electronics can include a processor 62 configured to operate the electronics as described in the '145 application. For instance, the electronics can be configured to operate the series balancing circuit and the shunt circuits as described in the '145 application.

The electronics can be positioned inside the case and/or outside of the case. For instance, the electronics can be positioned in a sub-housing located inside of the case or attached to an outside of the case.

Although the connections between the batteries and the terminals 16, between the batteries themselves, and/or between the batteries and electronics are not illustrated, typical battery connection devices and electrical communication technologies can be employed. For instance, wire, foils, and electrically conducting bars can be employed to provide the electrical connections.

Although FIG. 3 and FIG. 4 illustrates electronics 42 positioned in the case 10, the electronics can be positioned outside of the case. For instance, the electronics 42 can be positioned outside the case and can communication with the battery assembly through vias through the case.

Figure 5A:
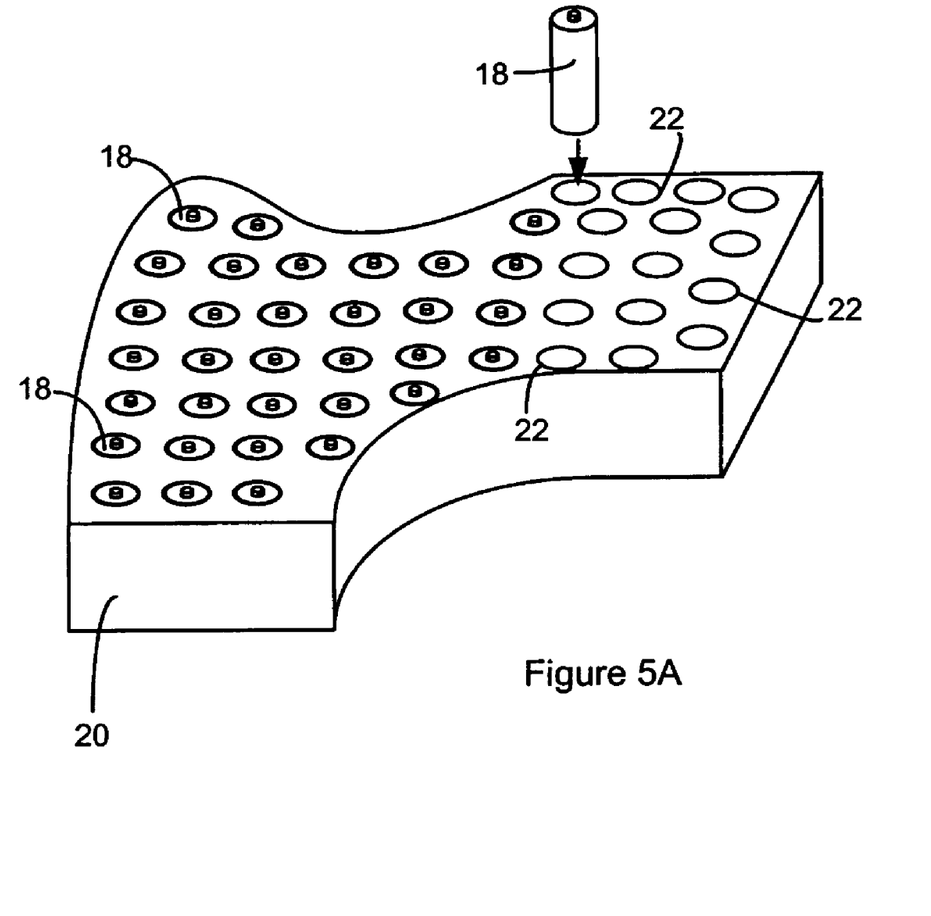
FIG. 5A and FIG. 5B illustrate a method of fabricating the battery pack.
Figure 5B:
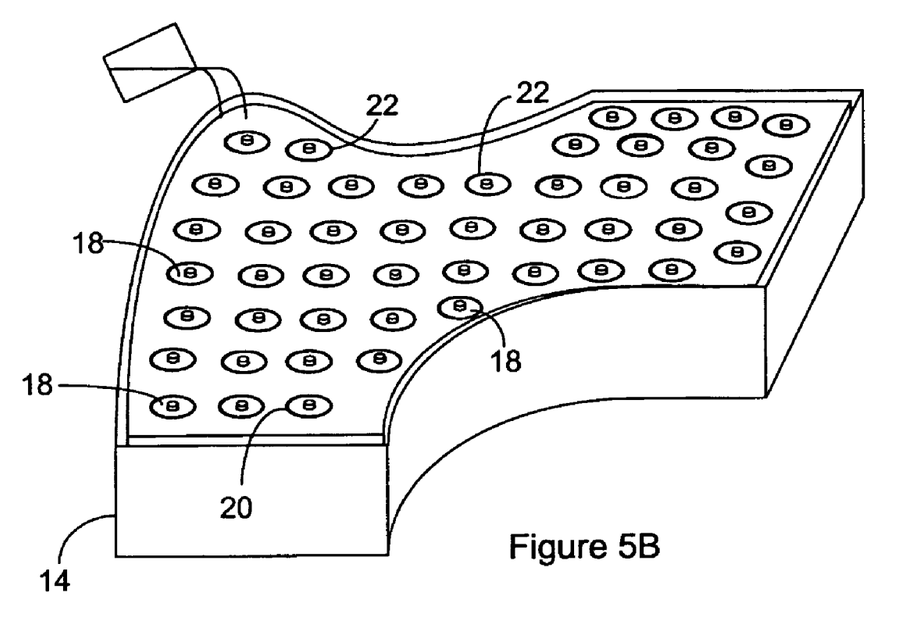
Figure 6:
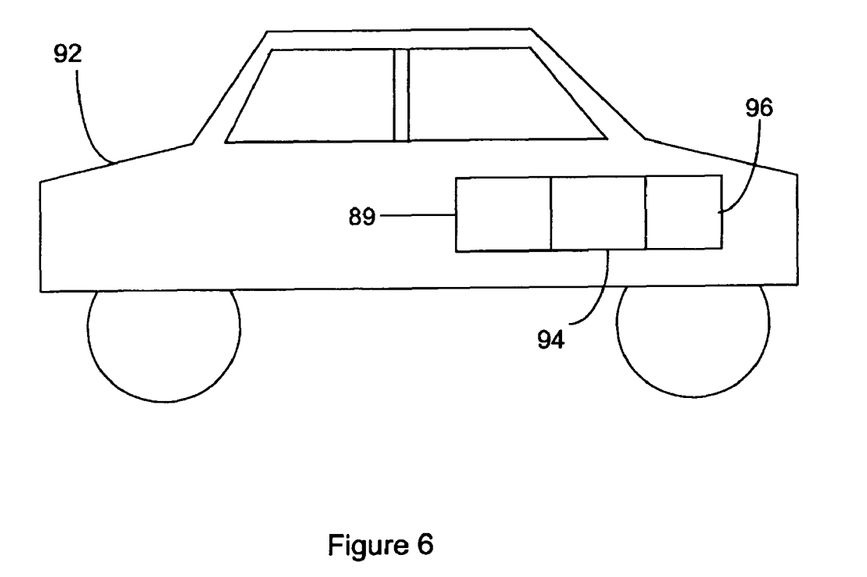
FIG. 6 illustrates a battery pack employed in a vehicle for transporting people.

FIG. 5A and FIG. 5B illustrate a method of fabricating the battery pack. In FIG. 5A, the batteries are positioned in the openings 22 in the one or more porous media 20. The one or more porous media 20 can be positioned in the case or receptacle 14 before the batteries are placed in the openings 22 or the batteries can be placed in the openings 22 before the one or more porous media 20 are positioned in the case or receptacle 14.

The one or more porous media 20 are positioned in the case or receptacle 14 and the one or more flame retardants are poured into the case or receptacle 14 as shown in FIG. 5B. One or more liquids that include or consists of the one or more flame retardants are poured into the case or receptacle 14 such that the one or more flame retardants are absorbed into the pores of the one or more porous media 20. In some instances, the one or more liquids are heated at the time they are poured. The operating temperature of the batteries can actually be less than the temperature of the one or more liquids at the time they are poured. As a result, the liquid can transition into a solid at the operating temperature of the battery pack. Accordingly, in some instances, the medium in the pores during operation of the battery pack is a solid that includes or consists of one or more flame retardants.

Although FIG. 5B shows the batteries positioned in the one or more porous media 20 before the one or more flame retardants are poured into the case or receptacle 14, the batteries need not be positioned in the one or more porous media 20 positioned before the one or more flame retardants are poured into the case or receptacle 14.

The electrical connections between the batteries and the terminals 16, between the batteries themselves, and/or between the batteries and electronics can be made before or after the one or more flame retardants are poured into the case or receptacle 14. The cover 12 can be attached to the case after these connections are made.

Although the battery pack is disclosed in the context of an automobile, the battery pack can be employed in other applications.

The battery pack can be employed to power movement of a vehicle. Examples of suitable vehicles are vehicles configured to hold and transport living people such as cars, truck and golf-carts. In some instances, the vehicles are for transporting people on land. FIG. 2 illustrates a battery pack 89 employed in a vehicle 92. The battery pack 89 provides an electrical signal to a drive source 94 which is connected to a power train 96. The power train is configured to transmit power from the battery pack 89 to a drive mechanism (not shown) such as a drive axel. The drive source can include a motor and/or engine. The battery pack 89 can assist the motor and/or engine in generating movement of the vehicle 92. Alternately, the battery pack 89 can be the only source of power provided to the drive source. Although the battery pack 89 is disclosed in the context of powering vehicles, the battery pack 89 can be employed in other applications.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery pack, comprising:
a porous medium positioned in a case;
batteries being held by the porous medium;
terminals for accessing power from the batteries, the terminals being accessible from outside of the case; and
a flame retardant in pores of the porous medium.

2. The battery pack of claim 1, wherein the batteries are connected in a plurality of parallel groups and a plurality of series groups,
each parallel group including a plurality of the batteries connected in parallel;
each series group connecting one of the batteries from each of the parallel groups in series.

3. The battery pack of claim 1, wherein the porous medium has a solid-liquid phase transition at a temperature less than a runaway temperature of the batteries.

4. The battery pack of claim 3 wherein the porous medium has a thermal conductivity greater than 1 W/mk and a melting point of less than 350° C.

5. The battery pack of claim 3, wherein the flame retardant is included in a liquid having an electrical conductivity less than $10^{-5}$ Scm$^{-1}$.

6. The battery pack of claim 4, wherein the flame retardant is included in a liquid having an electrical conductivity less than $10^{-5}$ Scm$^{-1}$.

7. The battery pack of claim 1, wherein the porous medium is a plastic.

8. The battery pack of claim 1, wherein plastics is a substituted or unsubstituted poly(phenylene sulfide).

9. The battery pack of claim 1, wherein the porous medium has a porosity greater than 5%.

10. The battery pack of claim 1, wherein the flame retardant has a boiling point between 80° C. and 160° C. at 1 atm.

11. The battery pack of claim 1, wherein the flame retardant has a heat of vaporization lower than 150 J/g at boiling point and 1 atm.

12. The battery pack of claim 1, wherein the flame retardant has a boiling point greater than 80° C. and less than a runaway temperature of the battery, the runaway temperature of the battery being determined from the self heating rate of the battery as generated from accelerated rate calorimetry.

13. The battery pack of claim 1, wherein the flame retardant is a perfluorocarbon.

14. The battery pack of claim 1, wherein the flame retardants is a fully or partially halogenated compound selected from a group consisting of alkanes, ethers, ketones, and amines substituted with one or more alkyl groups.

15. The battery pack of claim 14, wherein the flame retardant is represented by R'(C=O)R" wherein R' is a perfluoroalkyl group and R" is a perfluoroalkyl group or an alkyl group.

16. The battery pack of claim 14, wherein the flame retardant is a perfluoroketone.

17. The battery pack of claim 14, wherein the flame retardant is dodecafluoro-2-methylpentan-3-one.

18. The battery pack of claim 14, wherein the flame retardant is an ether.

19. The battery pack of claim 18, wherein the ether is a perfluorocyclic ether.

20. The battery pack of claim 18, wherein the ether is represented by R'OR" wherein R' is a perfluoroalkyl group and R" is a perfluoroalkyl group or an alkyl group.

21. The battery pack of claim 18, wherein the ether is a segregated hydrofluoroether.

22. The battery pack of claim 21, wherein the segregated hydrofluoroether is selected from a group consisting of: methoxy-heptafluoropropane, methoxy-nonafluorobutane, ethoxy-nonafluorobutane, perfluorohexylmethylether, and 2-trifluoromethyl-3-ethoxydodecofluorohexane.

23. The battery pack of claim 14, wherein the flame retardant is an amine substituted with one or more perfluoroalkyl groups.

24. The battery pack of claim 23, wherein the flame retardant is an amine substituted with three perfluoroalkyl groups.

25. The battery pack of claim 24, wherein the amine is selected from a group consisting of perfluorotripentylamine, perfluorotributylamine, perfluorotripropylamine and perfluoro-n-dibutylmethylamine.

26. The battery pack of claim 14, wherein the flame retardant is an alkane.

27. The battery pack of claim 26, wherein the alkane is a perfluoroalkane.

28. The battery pack of claim 27, wherein the perfluoroalkane is selected from a group consisting of perfluoropentane, perfluorohexane, perfluoroheptane, perfluoroctane, and perfluoro-1,3-dimethylcyclohexane.

29. The battery pack of claim 1, wherein the flame retardant is a phosphazene.

30. The battery pack of claim 29, wherein the flame retardant is a cyclic phosphazene.

31. The battery pack of claim 29, wherein the flame retardant is a halogenated cyclic phosphazene.

32. A battery pack, comprising:
a porous medium positioned in a case, the porous medium including a substituted or unsubstituted poly(phenylene sulfide) and having a porosity greater than 20%;
batteries being held by the porous medium, the batteries being connected in a plurality of parallel groups and a plurality of series groups, each parallel group including a plurality of the batteries connected in parallel and each series group connecting one of the batteries from each of the parallel groups in series;
terminals for accessing power from the batteries, the terminals being accessible from outside of the case; and
a flame retardant absorbed into pores of the porous medium, the flame retardant being a fully or partially halogenated compound selected from a group consisting of alkanes, ethers, ketones, and amines substituted with one or more alkyl groups.

* * * * *